(No Model.)
J. L. WOODSIDE.
PIPE JOINT COVER.
No. 544,943. Patented Aug. 20, 1895.
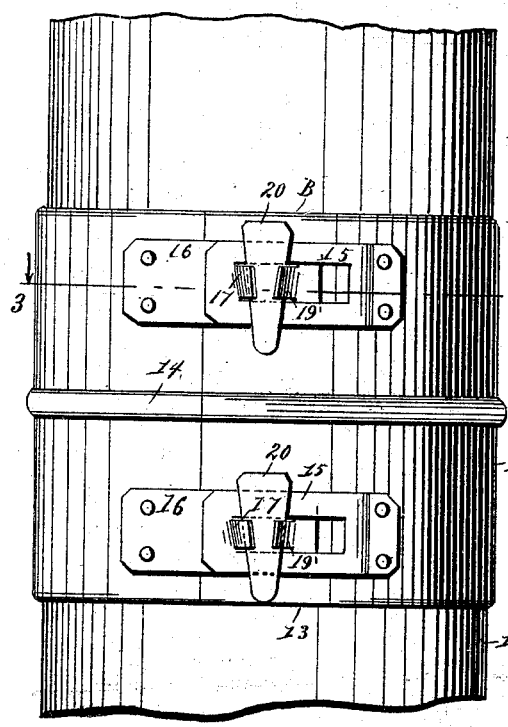
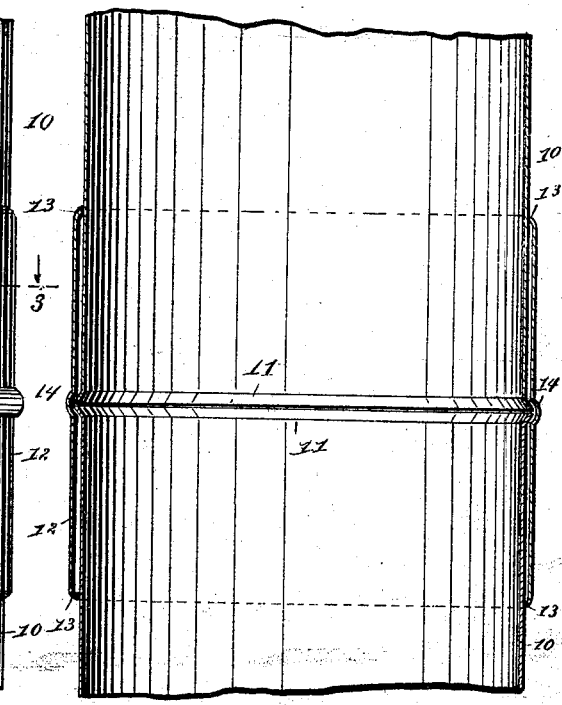
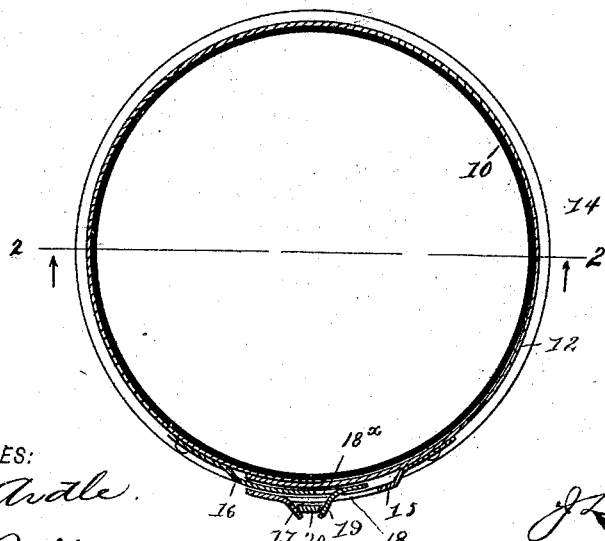
WITNESSES:
F. McArdle
Wm. L. Patton
INVENTOR
J. L. Woodside
BY Munn & Co
ATTORNEYS.

UNITED STATES PATENT OFFICE.

JAMES L. WOODSIDE, OF HAWARDEN, IOWA.

PIPE-JOINT COVER.

SPECIFICATION forming part of Letters Patent No. 544,943, dated August 20, 1895.

Application filed August 14, 1894. Serial No. 520,265. (No model.)

*To all whom it may concern:*

Be it known that I, JAMES L. WOODSIDE, of Hawarden, in the county of Sioux and State of Iowa, have invented a new and useful Improved Pipe-Joint Cover, of which the following is a full, clear, and exact description.

My invention relates to an improved reinforcing-cover for the joints between pipe-sections, and particularly for sheet-metal pipe-joints, and has for its object to provide a novel and simple joint-cover for stovepipe-sections or other sheet-metal tubular pieces which are to be joined together at the ends to produce a continuous pipe.

A further object is to produce a pipe-joint cover in band form, which will be easy to apply, be adapted to strongly unite the engaged ends of pipe-sections, be capable of ready separation to disconnect pipe-sections when required, and that may be cheaply produced in quantity from any available sheet metal.

To these ends my invention consists in the construction and combination of parts, as is hereinafter described, and indicated in the claims.

Reference is to be had to the accompanying drawings, forming a part of this specification, in which similar figures of reference indicate corresponding parts in all the views shown.

Figure 1 is a side view in part of two sheet-metal pipe-sections and the improved joint-cover applied to secure together and protect the joint at the meeting ends of the pipe-sections. Fig. 2 is a sectional side view of the improvement in place on two pipe-sections in part on the line 2 2 in Fig. 3, and Fig. 3 is a transverse sectional view of parts shown in Fig. 1 on the line 3 3 in said figure.

The improvement is applicable to cover the joints between the abutted ends of sheet-metal pipes of any desired diameter, and when in position serves to render the joints between pipe-sections tight, holding them impinged at their meeting ends in a secure manner and affording a smooth interior surface for the pipe if the latter has its ends specially formed to receive the improved cover, which is also adapted for application to pipe-sections that are provided with slip-joints in the usual way.

In the drawings, 10 represents the pipe-sections to be joined at their ends for the production of a continuous pipe, and as it is preferred to use the improvement in connection with a special construction of the ends of the pipe-sections, which in this case indicate portions of stovepipe, the stovepipe-sections where they meet are each furnished with an outwardly-turned flange 11, as is clearly represented in Fig. 2.

Preferably the flanges 11 are bent outwardly at an angle of about forty-five degrees from the walls of the pipe-sections, thereby forming a bead-like peripheral projection at the joined ends of the pipe-sections.

The improvement comprises the following described parts: 12 represents a sheet-metal band, which is made of a width that is proportioned to suit the dimensions of the pipe, so as to be adapted to afford substantial support to the joined ends of two similar pipe-sections, said band having such a relative length as will permit its end portions to lap on each other when the joint-cover is applied to the pipe-sections it is to connect. The side edges 13 of the band 12 are bent nearly at a right angle in the same direction, these edges being designed to impinge the outer surface of two pipe-sections when in place on the same, thereby maintaining the main portion of the band slightly removed from the pipe-sections, as clearly shown in Fig. 2. An outwardly-projecting bead 14 is formed on the band 12 at its center of width, which bead extends throughout the length of the part it is formed on and produces a corresponding channel in the sheet-metal band on its inner surface. The bead and channel are proportioned in depth or degree of projection as well as width, so as to permit the impinged flanges 11 to lie in the channel of the bead 14, when the band 12 is caused to tightly embrace the pipe-sections at their ends, and, as shown in Fig. 2, the constriction of the band or cover-piece on the pipe-sections causes the inturned edges 13 of the band, as well as the hollow bead 14, to press tightly upon the pipe, so as to maintain its sections in alignment and their point of junction closely covered, leaving the inner surface of the pipe smooth.

The means furnished to detachably connect the lapped ends of the part 12 is a feature of the invention and consists of duplicate locking devices, each constructed as follows: Two straps 15 16, that are formed of sheet metal, are secured by one end of each on the end portions of the band 12, near one side edge of the latter, thus permitting the free end portions of the straps to have a lapped engagement with their side edges respectively aligned. A locking-ear 17 is produced on the outer strap 15, near its free end, by the formation of a longitudinal slot 18 at the center of width of the strap and turning said ear outwardly from material integral with the strap at the outer terminal of the slot. A similar ear 19 is formed near the outer end of the other strap 16 by a slot 18, Fig. 3, similar to slot 18, and this ear is entered within the slot 18, when the band 12 is made to encompass the impinging end portions of two pipe-sections.

It will be seen that the ears 17 19 are inclined toward each other when the parts are connected, as is represented in the drawings, and that the constriction of the cover-piece or band 12 will be effected by an enforced separation of the ears. A key 20 is provided for each pair of ears, and as the straps 15 16 are duplicated and located near the bent side edges of the band it will be evident that the keys 20, which are flat and tapered on their edges, will, if driven between the pairs of ears on the straps, separate the ears and draw on the straps, so as to closely bind the band on the pipe-sections 10, thereby securely locking the latter together and effectually sealing the joint between said sections.

The improvement is available for use in connecting ordinary slip-jointed pipe-sections, as well as the specially-formed pipe-sections that have been described, it being only necessary that there be a circumferential bead formed on the outer piece of the joined pipe-sections for the reception of the hollow bead 14 on the joint-covering band 12, the application of the latter to lock the slip-joint from separation being effected as has already been described.

The improvement is of special advantage for the connection of pipe-sections to provide a long pipe that is to be sustained in a horizontal or inclined position, as it affords support at the points of junction to the several sections forming the line of pipe and prevents any portion of the pipe from sagging, even if it is not supported by hanger-wires or like means.

In the erection of high boiler-stacks that are made up of a number of sections the latter can be joined together by the improved joint-covers and thus dispense with riveting together the entire series of the tubular sections forming the stack, which is very advantageous, as the retention of the stack in short lengths greatly facilitates its transportation, while its erection can be effected by connecting the sections successively at the point where the stack is to be placed.

The neatness of exterior appearance and avoiding of interior projections are features of evident advantage afforded by the improvement.

Having thus described my invention, I claim as new, and desire to secure by Letters Patent—

1. A pipe-joint cover comprising a sheet metal band having its end portions adapted to lap one over the other when the cover is applied to the joint, said band having the side edges of its body and of its overlapped end portions bent inwardly and adapted to impinge on the peripheries of the pipe sections on opposite sides of the joint and having a central longitudinal groove in the inner faces of said body and overlapping end portions, and means for securing the ends of the band together, substantially as set forth.

2. In a pipe joint cover, the combination of a sheet metal band the side edges of which are bent to impinge upon the pipe sections, and also having a longitudinal groove formed intermediate of said bent edges and on the same side of the band therewith, two straps secured by their ends on the outer side of the band near its ends, one slotted and each having an inclined ear, the ear on one strap sliding in the slot of the other, and an edge tapered key adapted to separate the ears and contract the band, substantially as described.

JAMES L. WOODSIDE.

Witnesses:
W. E. WEST,
C. L. STEWART.